United States Patent
Zhou et al.

(10) Patent No.: US 9,328,258 B2
(45) Date of Patent: May 3, 2016

(54) POST-TREATMENT SOLUTION FOR DIGITAL INKJET PRINTING

(71) Applicant: Hewlett-Packard Development Company, L.P., Houston, TX (US)

(72) Inventors: Xiaoqi Zhou, San Diego, CA (US); Lokendra Pal, San Diego, CA (US); Xulong Fu, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/433,260

(22) PCT Filed: Oct. 29, 2012

(86) PCT No.: PCT/US2012/062403
§ 371 (c)(1),
(2) Date: Apr. 2, 2015

(87) PCT Pub. No.: WO2014/070132
PCT Pub. Date: May 8, 2014

(65) Prior Publication Data
US 2015/0267073 A1     Sep. 24, 2015

(51) Int. Cl.
| | |
|---|---|
| *B41M 5/00* | (2006.01) |
| *C09D 133/10* | (2006.01) |
| *B41M 5/50* | (2006.01) |
| *B41J 11/00* | (2006.01) |

(Continued)

(52) U.S. Cl.
CPC ........... *C09D 133/10* (2013.01); *B41J 11/0015* (2013.01); *B41M 5/502* (2013.01); *B41M 7/0018* (2013.01); *B41M 7/0027* (2013.01); *B41M 7/0054* (2013.01); *C09D 5/00* (2013.01); *C09D 7/1233* (2013.01); *C09D 11/38* (2013.01); *C09D 11/40* (2013.01); *C09D 11/54* (2013.01); *C08K 5/3415* (2013.01); *Y10T 428/24868* (2015.01); *Y10T 428/24884* (2015.01)

(58) Field of Classification Search
CPC .. C09D 133/10; B41M 5/502; B41M 7/0018; B41M 7/0054; Y10T 428/24868; Y10T 428/24884
See application file for complete search history.

(56) References Cited

U.S. PATENT DOCUMENTS

| | | |
|---|---|---|
| 5,753,077 A | 5/1998 | Horand et al. |
| 5,952,091 A | 9/1999 | Horand et al. |

(Continued)

FOREIGN PATENT DOCUMENTS

| | | |
|---|---|---|
| EP | 1 022 151 | 7/2000 |
| EP | 1 145 865 | 10/2001 |

(Continued)

OTHER PUBLICATIONS

The Extended European Search Report for Application No. 12887642.2 dated Sep. 24, 2015, 7 pages.

*Primary Examiner* — Betelhem Shewareged
(74) *Attorney, Agent, or Firm* — Dierker & Associates, P.C.

(57) ABSTRACT

A post-treatment solution for digital inkjet printing includes polymer particulates having a minimum film-forming temperature that is at least 50° C., a film-forming agent, and a liquid carrier. The film-forming agent is selected from the group consisting of citrate compounds, sebacate compounds, ethoxy alcohols, glycol oligomers, glycol polymers, glycol ether, glycerol acetals, and cyclic amides. A print medium, printing method, and printing system are also disclosed herein.

15 Claims, 1 Drawing Sheet

(51) Int. Cl.
  *C09D 11/38* (2014.01)
  *C09D 11/40* (2014.01)
  *C09D 11/54* (2014.01)
  *B41M 7/00* (2006.01)
  *C09D 5/00* (2006.01)
  *C09D 7/12* (2006.01)
  *C08K 5/3415* (2006.01)

(56) References Cited

U.S. PATENT DOCUMENTS

| | | | |
|---|---|---|---|
| 6,391,155 | B1 | 5/2002 | Wurster et al. |
| 6,413,370 | B1 | 7/2002 | Wurster et al. |
| 7,959,251 | B2 | 6/2011 | Furukawa |
| 8,053,044 | B2 | 11/2011 | Zhou et al. |
| 2003/0018120 | A1 | 1/2003 | Lee et al. |
| 2009/0324936 | A1* | 12/2009 | Kim .................. C08F 36/04 428/335 |
| 2010/0166985 | A1 | 7/2010 | Brockmeyer et al. |
| 2010/0310864 | A1 | 12/2010 | Cherukuri |
| 2011/0148980 | A1 | 6/2011 | Arai et al. |
| 2012/0082846 | A1 | 4/2012 | Song et al. |
| 2012/0128949 | A1 | 5/2012 | Goto |
| 2013/0201252 | A1* | 8/2013 | Namba .................. C09D 5/00 347/21 |

FOREIGN PATENT DOCUMENTS

| | | |
|---|---|---|
| EP | 2 105 317 | 9/2009 |
| JP | H11-216855 | 8/1999 |
| JP | 2002321350 | 11/2002 |
| JP | 2004034562 | 2/2004 |
| JP | 2004202710 | 7/2004 |
| WO | WO-2013025210 | 2/2013 |

* cited by examiner

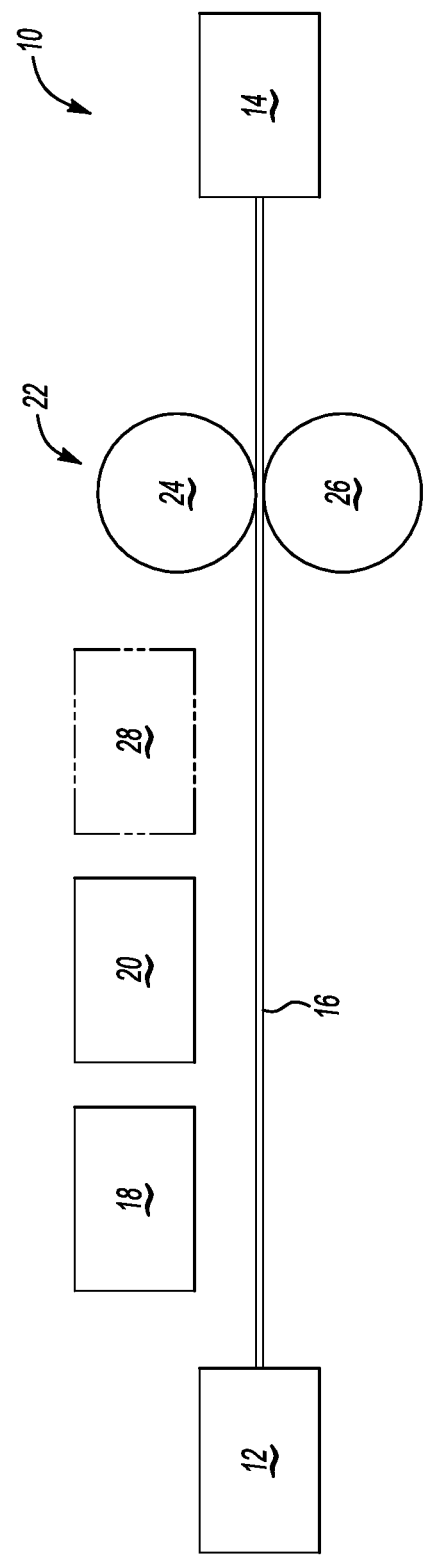

POST-TREATMENT SOLUTION FOR DIGITAL INKJET PRINTING

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWING

Features and advantages of examples of the present disclosure will become apparent by reference to the following detailed description and drawing.

FIG. 1 is a schematic illustration of an example of a printing system.

DETAILED DESCRIPTION

The present disclosure relates generally to a post-treatment solution for digital inkjet printing. Also disclosed herein are a printed medium, a printing method, and a printing system which include or utilize the post-treatment solution.

Examples of the post-treatment solution disclosed herein enhance a number of properties of the resulting printed media. As examples, both image gloss and durability of the printed media may be improved compared, for example, to printed media that has not been treated with examples of the post-treatment solution. The post-treatment solution disclosed herein may also be applied in-line with a high-speed inkjet printing process. It is believed that the film-forming agent in the post-treatment solution enhances the formation of a transparent film. This enables the printed media to be generated via high-speed inkjet technology while also exhibiting improved image quality (e.g., gloss) and durability (e.g., rub and smear resistance). This is advantageous because current media and printing techniques may introduce obstacles that prevent achieving both high image quality and durability of the resulting print.

Referring now to FIG. 1, an example of the printing system 10 is schematically depicted. The printing system 10 is a high-speed inkjet printer which can be operated at a printing speed up to 1500 feet per minute. The printing system 10 includes a media transport device (including media input 12 and media output 14), an ink applicator 18, a post-treatment applicator 20, and a film-forming system 22. As will be discussed further herein, the post-treatment applicator 20 and the film-forming system 22 may be in-line with the other system 10 components, or may be respective off-line systems that are separate from one another and separate from the other system 10 components, or may be combined into a single off-line system that is separate from the other system 10 components. Furthermore, while not shown, it is to be understood that the system 10 may also include a dryer 28 between the post-treatment applicator 20 and the film-forming system 22. Another dryer (not shown) may also be included between the ink applicator 18 and the post-treatment applicator 20 in order to dry the deposited ink before applying the post-treatment solution.

Still further, a controller (not shown) having processing unit(s) that transmit(s) signals to the various system components may be included to operate each of the components in a desirable manner to form image(s) on a medium 16. When at least some of the components are off-line, it is to be understood that various controllers may be included. Additional auxiliary equipment, such as a static control bar, a moisturizing unit, a finishing device, may also be incorporated in the printing system 10 in-line or off-line to make the final print medium.

As used herein, "image" refers to marks, signs, symbols, figures, indications, and/or appearances deposited upon a material or substrate with either a visible or an invisible inkjet ink composition. Examples of an image can include characters, words, numbers, alphanumeric symbols, punctuation, text, lines, underlines, and the like.

In an example, the media transport device is a mechanism that, when in operation, transports or moves the medium 16 relative to and between at least the ink applicator 18, the post-treatment applicator 20, and the film-forming system 22. It is to be understood that when the post-treatment applicator 20 and/or the film-forming system 22 is/are an off-line system (i.e., detached from the other printing system 10 components), the post-treatment applicator 20 and/or the film-forming system 22 may include a separate media transport device.

The media transport device shown in FIG. 1 includes the media input 12 and the media output 14. The input 12 receives the media 16 into the system 10, the output 14 exits the media 16 from the system 10, and a transport mechanism (not shown) moves the media 16 between the input 12 and the output 14. In an example, the media transport device moves the medium 16 in the form of a web, and the media input 12 and the media output 14 include, respectively, supply and take up rolls. In another example, the media transport device moves the medium 16 in the form of individual sheets. In still another example, the media transport device initially moves the media in the form of a web, but the system 10 may convert the web into sheet form before any intermediate steps take place (e.g., before ink application) or just before existing the system 10 (e.g., after film-forming and before being transported to the output 14). It is to be understood that the media transport mechanism may include rollers, belts, conveyors or other structures to drive and move the medium 16.

The medium 16 disclosed herein may be a cellulose base substrate (e.g., paper or board) that is coated or uncoated. The cellulose base substrate includes, in an example, pulp and filler. The pulp may be wood pulp (e.g., kraft chemical pulp, sulfite chemical pulp, groundwood pulp, thermomechanical pulp, and/or chemo-thermomechanical pulp), wood-free pulp, recycled fabric pulp, or combinations thereof. The filler may be kaolin clay, calcined clay, ground calcium carbonate, precipitated calcium carbonate, gypsum (i.e., hydrated calcium sulfate), silica, talc, zeolite, titanium oxide, or combinations thereof. In an example, the cellulose base substrate includes from about 3 wt. % to about 35 wt. % filler and a balance of pulp. In another example, the cellulose base substrate may also include other additives, such as sizing agents, alkenyl or alkylsuccinic acid anhydride emulsification products and rosin derivatives, dry strengthening agents, wet strengthening agents, retention aids, flocculants, deinking agents, surfactants, fixers, pH adjustors, biocides, and/or coloring agents. Any of these additives may be added to the base substrate or may be applied to surface(s) of the base substrate (using a surface treatment) in an amount ranging from about 0.5 wt. % to about 25 wt. %. In an example, any of the additives may be added in an amount ranging from about 1 wt. % to about 10 wt. %.

Examples of suitable sizing agents include metal salts of fatty acids and/or fatty acids, alkyl ketene dimer emulsification products, and/or epoxidized higher fatty acid amides. Some specific examples of metal salts include metal cations, such as potassium, sodium, calcium, magnesium, barium, strontium, and aluminum ions, and anions, such as fluoride, chloride, iodide, bromide, nitrate, chlorate, and acetate ions. Suitable synthetic sizing agents include acrylic emulsion products, polyurethanes, styrene acrylic solutions, styrene acrylate emulsions, ethylene acrylic acids, and styrene maleic anhydride. Various combinations and/or derivatives of metal salts may also be used. Some examples of dry strengthening agents include glyoxal, anionic, cationic or amphoteric polyacrylamides (e.g., glyoxal functionalized polyacrylamide or its copolymers), polyvinyl alcohol, amphoteric or cationized starch, casein, and vegetable galactomannan; while some examples of wet strengthening agents include dialdehyde starch and polyamine-polyamide-epichlorohydrin resins (e.g., polyamido-amine-epichlorohydrin, PEA). Water-soluble aluminum salts, aluminum chloride, and aluminum sulfate may be used as fixers, and sodium hydroxide, sodium carbonate and sulfuric acid may be used as pH adjustors. Examples of some suitable coloring agents include pigments, coloring dyes, and fluorescent brighteners.

The cellulose base substrate may also have a basis weight ranging from about 35 grams per square meter (gsm) to about 500 gsm.

When an uncoated cellulose base substrate is selected as the medium 16, the cellulose base substrate may be subjected to a surface treatment. The surface treatment may be performed off-line before printing, or may be applied in-line as a pre-treatment before printing. For example, one or both sides of the cellulose base substrate may be exposed to a surface treatment process, where a metallic salt, a binder, a cross-linking agent, an optical brightening agent, a synthetic sizing agent, a wet and/or dry strengthening agent, and/or a dye is/are selectively applied to the surface(s).

Any of the previous examples of metal salts, synthetic sizing agents, wet strengthening agents and dry strengthening agents may be used in a surface treatment process. Examples of suitable binders include natural substances (such as starch) and/or synthetic components (such as polymeric latex and polymeric water soluble components, e.g., poly(vinyl alcohol) (PVA)). Examples of suitable optical brightening agents include azoles; biphenyls; coumarins; furans; ionic brighteners such as anionic, cationic, and nonionic (neutral) compounds; naphthalimides; pyrazenes; substituted (e.g., sulfonated) stilbenes; salts of the previously listed compounds, including alkali metal salts, alkaline earth metal salts, transition metal salts, organic salts and ammonium salts; and combinations of one or more of the foregoing agents.

As mentioned above, a coated cellulose base substrate may also be selected as the medium 16. Examples of coated cellulose base substrates include pigmented coated offset paper, solid bleached board, liner board, corrugated board, container board, and liquid packing board. Other examples of coated substrates include plastic film base papers or photo base papers. Similar to the uncoated substrates, coated substrates (such as coated cellulose base substrates or coated plastic film base substrates) may also be subjected to a surface treatment prior to printing. For example, one or both sides of the coated substrate may be exposed to the surface treatment process, where the metallic salt, the binder, the cross-linking agent, the optical brightening agent, the synthetic sizing agent, the wet and/or dry strengthening agent, and/or the dye is/are selectively applied to the surface(s).

During operation, the medium 16 is moved from the media input 12 toward the media output 14 and in proximity of the ink applicator 18 so that ink may be dispensed onto the medium 16 from the ink applicator 18.

In the system 10, it is to be understood that the ink applicator 18 may be a print engine that supplies one or more colors of ink to the medium 16. The ink applicator 18 may include a plurality of printbars that are fixed in positions to provide full color printing across the width of the medium 16 as the medium 16 is moved with respect to the printbars. In an example print engine, two printbars in tandem are configured to respectively dispense each of the colored inks. Each printbar may include a plurality of (replaceable) inkjet printheads or pens that extend the width of the medium 16. Examples of the inkjet printheads or pens may include thermal inkjet printheads or pens (which use pressure caused by bubbles formed by heating ink), acoustic inkjet printheads or pens (in which an electric signal is transformed into an acoustic beam and ink is irradiated with the acoustic beam so as to be ejected by radiation pressure), or piezoelectric inkjet printheads or pens (a drop-on-demand method which uses vibration pressure of a piezo element). The ink(s) may be stored in respective reservoirs/cartridges that are in selective fluid communication with one or more printhead(s) or pen(s).

Any inkjet ink may be contained in and dispensed from the ink applicator 18. The inkjet ink(s) may be black, yellow, cyan, light cyan, magenta, light magenta, orange, red, green, or any other desirable color. In an example, the inkjet ink includes an ink vehicle and a colorant. Examples of suitable components for the ink vehicle include water soluble polymers, anionic polymers, surfactants, solvents, co-solvents, buffers, biocides, sequestering agents, viscosity modifiers, surface-active agents, chelating agents, resins, and/or water, and/or combinations thereof. The colorants may be pigments, dyes, or a combination thereof. In some instances, a colorless fixing solution may be applied (e.g., by the ink applicator 18) to bond the ink colorant to the medium 16. The colorless fixing solution may include any of the ink components, except for the colorant.

When the post-treatment applicator 20 is in-line, the medium 16, having ink applied to at least a portion thereof, is moved in proximity of the post-treatment applicator 20 so that the post-treatment solution may be applied onto all or a portion of the medium 16. The post-treatment applicator 20 may be running at the same speed as the ink applicator 18. When the post-treatment applicator 20 is off-line, the medium 16 may be transferred to another system including the post-treatment applicator 20 for the application of the post-treatment solution.

Whether in-line or off-line, the post-treatment applicator 20 may include mechanisms and/or devices that utilize thermal inkjet printing, rod coating, dip coating, film transfer, or curtain coating to apply the post-treatment solution to the printed-on medium 16. Examples of other suitable post-treatment applicators 20 include air doctor coaters, blade coaters, knife coaters, squeeze coaters, impregnation coaters, roll coaters or reverse roll coaters, transfer roll coaters, gravure coaters, kiss-roll coaters, cast coaters, spray coaters, offset coaters, flexo coaters, and extrusion coaters.

In an example, the post-treatment applicator 20 applies the post-treatment solution in a range of about 0.1 gsm to about 15.0 gsm. In another example, the post-treatment applicator 20 applied the post-treatment solution in a range of about 0.5 gsm to about 5.0 gsm. It is to be understood that the post-treatment applicator 20 may be configured to apply the post-treatment solution at other coating weights as well.

The post-treatment solution contained in the post-treatment applicator 20 includes a liquid carrier, polymer particulates, and a film-forming agent. In some instances, the post-treatment solution also includes a surfactant and/or a polymer binder.

The polymer particulates in the post-treatment solution have a minimum film-forming temperature (MFFT) of at least 50° C. The minimum film-forming temperature of the polymer particulates refers to a physical quality or temperature at which the dispersed or emulsified polymer particulates will coalesce, when laid on a substrate, to form a thin smooth, clear, transparent film. Without being bound to any theory, it is believed that polymer particulates with a higher MFFT will form a film (when exposed to a temperature above the MFFT) with a high gloss appearance. In an example, the polymer particulates have a minimum film-forming temperature ranging from over 50° C. to about 100° C. It has been found that polymer particulates with a higher MMFT should be exposed to the specific temperature or condition in order to obtain a desirable film; otherwise, a white, powdery and cracked film may form. The inventors of the present disclosure have found that by including the film-forming agent(s) disclosed herein, higher MMFT polymer particulates may be utilized in a high speed printing process to form a transparent protective film. More specifically, it is believed that the film-forming agent that is used in the post-treatment solution enables polymer particulates with relatively high minimum film-forming temperatures to readily coalesce. This is due, at least in part, to the film-forming agent being capable of lowering the elastic modulus of the polymer particulates and providing temporary plasticization to promote polymer chain motion during the film-forming process. This enhances the film-forming capabilities of the polymer particulates, including those polymer particulates with higher minimum film-forming temperatures.

The polymer particulates may be latex particles made up of monomer(s) that are polymerized in a random, block, and/or grafting manner, and in some instances are cross-linked. One or more types of monomers may be polymerized to form the polymer particulates. In an example, the polymer particulates are homopolymers of methacrylic acid esters. In another example, the polymer particulates are copolymers of a methacrylic acid ester and any of an acrylic acid ester, styrene, or divinyl benzene. Some examples of the monomers that may be used to form the polymer particulates include methyl methacrylate, t-butylmethacrylate, methyl acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate, hydroxyethylacrylate, hydroxyethylmethacrylate, hydroxypropylacrylate, hydroxypropylmethacrylate, ethylene glycol di(meth)acrylate, allyl (meth)acrylate, 1,3-butanediol di(meth)acrylate, diethylene glycol di(meth)acrylate, and trimethylol propane trimethacrylate.

In some examples, the polymeric particulates are prepared using an emulsion polymerization process. For example, various weight ratios of styrene, hexyl methacrylate, ethylene glycol di(meth)acrylate, and methacrylic acid may be mixed together to emulsify monomer droplets. These droplets may be dispersed under mechanical shear force surrounded by emulsifiers to form micelles. Polymerization takes place after initiator molecules diffuse into the micelles, which forms the polymer particulates. In an example, the styrene and hexyl methacrylate monomers may be used in amounts so that they will provide the bulk of the polymeric particulates (e.g., from about 75 wt. % to about 85 wt. %), and the ethylene glycol di(meth)acrylate and methacrylic acid monomers may be used in smaller amounts (e.g., equal to or less than 25 wt. %).

The polymer particulates may have a weight average molecular weight ranging from about 10,000 to about 2,000,000, or as one example, from about 40,000 to about 100,000. When the polymer particulates are cross-linked, the combined molecular weight of the cross-linked particulates may exceed 2,000,000. In addition, the average particle diameter of the polymer particulates ranges from about 20 nm to about 500 nm. In an example, the average particle diameter ranges from about 100 nm to about 300 nm.

The polymer particulates may be present in post-treatment solution in an amount ranging from about 0.5 wt. % to about 50 wt. % of the total wt. % of the post-treatment solution.

As previously mentioned, the film-forming agent that is used is capable of lowering the elastic modulus of the polymer particulates and providing temporary plasticization, which promotes polymer chain motion of the polymer particulates during the film forming process. As such, the polymer particulates are more readily able to coalesce, and therefore the film-forming agent improves the film-forming properties of the polymer particulates. Suitable film-forming agents exhibit both compatibility with aqueous solvents (e.g., water) and temperature volatility. Film-forming agents that exhibit temperature volatility are able to remain in the liquid state and have less than 30% to 70% volatility under heated post-treatment processing. Examples of the film-forming agents include citrate compounds, sebacate compounds, ethoxy alcohols, glycol oligomers, glycol polymers, glycol ether, glycerol acetals, cyclic amides, or combinations thereof. The cyclic amides may be β-lactams (e.g., clavam, oxacephem, cephem, penam, carbapenam, and monobactam), γ-lactams (e.g., N-methyl-2-Pyrrolidone, 5-methyl-2-Pyrrolidone, and 2-Pyrrolidone), δ-lactams (e.g., caprolactam and glucarolactam), and mixtures thereof.

The amount of film-forming agent present in the post-treatment solution may be dependent upon the amount of polymer particulates that are included. For example, a weight ratio of the film-forming agent to the polymer particulates ranges from about 1:100 to about 1:1. As such, in some examples, up to 100 times more (based on weight) of the polymer particulates may be used than the film-forming agent. In other example, the same weight percent of the polymer particulates and film-forming agent may be used.

The liquid carrier generally makes up a balance of the post-treatment solution so that the final solution has a solids content that is up to 70%. The liquid carrier may be any aqueous liquid carrier and/or any organic liquid carrier. In an example the liquid carrier is water. Examples of organic liquid carriers include n-butanol, isobutanol, propylene glycol monomethyl ethyl propionate (PGMEP), heptanes, cyclopentane, and cyclohexane.

In some examples, the post-treatment solution includes the polymer particulates, the film-forming agent, and the liquid carrier. In these examples, no other components are added to the post-treatment solution. In other examples, the post-treatment solution includes the polymer particulates, the film-forming agent, a surfactant and/or a polymer binder, and a balance of the liquid carrier.

When a surfactant is included in the post-treatment solution, the surfactant is present in an amount ranging from about 0.01 wt. % to about 6.0 wt. % of the total wt. % of the solution. In an example, the post-treatment solution includes about 0.5 wt. % surfactant. The surfactant may be anionic, cationic, or nonionic. In an example, the surfactant has a carbon backbone that includes more than 12 carbons.

Suitable anionic surfactants that may be used in the post-treatment solution include dodecyl sulfate and lauryl sulfate in the form of a sodium salt (e.g., sodium laureth sulfate), ammonium salt, or ethanolamine salt; hydroxy alkane sulfonate; and 2-bis (ethyl-hexyl) sodium sulfosuccinate.

Suitable cationic surfactants that may be used in the post-treatment solution include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

Suitable nonionic surfactants include nonionic fluorosurfactants, nonionic acetylenic diol surfactants, nonionic ethoxylated alcohol surfactants and combinations thereof. Several commercially available nonionic surfactants may be used in the formulation of the treatment solution, examples of which include ethoxylated alcohols such as those from the TERGITOL® series (e.g., TERGITOL® 15S30 or TERGITOL® 15S9, manufactured by Dow Chemical); surfactants from the SURFYNOL® series (e.g. SURFYNOL® 440 and SURFYNOL® 465, manufactured by Air Products Co); fluorinated surfactants, such as those from the ZONYL® family (e.g., ZONYL® FSO and ZONYL® FSN, manufactured by E.I. DuPont de Nemours); fluorinated POLYFOX® nonionic surfactants (e.g., PF159 nonionic surfactants), manufactured by Omnova, or combinations thereof. Other nonionic surfactants, such as acetylene glycol-based surfactants and/or polyether denatured siloxane surfactants, may also be used. Examples of acetylene glycol-based surfactants include 2,4,7,9-tetramethyl-5-decyne-4,7-diol; 3,6-dimethyl-4-octyne-3,6-diol; and 3,5-dimethyl-1-hexyne-3-ol. Commercially available acetylene glycol-based surfactants include SURFYNOL® 104, 82, 465, 485, and TG, and OLFIN® STG and OLFIN® E1010 manufactured by Nissin Chemical Industry Co. Examples of polyether denatured siloxane-based surfactants include BYK-345®, BYK-346®, BYK-347®, BYK-348®, and UV3530® of Byk Co.

When a polymer binder is included in the post-treatment solution, the polymer binder is present in an amount ranging from about 0.5 wt. % to about 15 wt. % of the total wt. % of the solution. The polymer binder may be added to enhance the adhesion of the polymer particulates to one another during film-formation and/or to enhance the adhesion of the polymer particulates to the medium 16 during film-formation. In an example, the polymer binder may be any polymer having a minimum film-forming temperature that ranges from about −40° C. to about 50° C. Examples of suitable binders are aqueous-based binders, including poly(vinyl alcohol), styrene-butadiene emulsions, acrylonitrile-butadiene latex, or combinations thereof. These binders may be used with other aqueous-based binders, such as starch (e.g., oxidized starch, cationized starch, esterified starch, enzymatically denatured starch, etc.), gelatin, casein, soybean protein, cellulose derivatives (e.g., carboxy-methyl cellulose, hydroxyethyl cellulose, etc.), acrylic emulsions, vinyl acetate emulsions, vinylidene chloride emulsions, polyester emulsions, and polyvinylpyrrolidone. It is to be understood that the polymer binder may or may not have the same chemical properties as the polymer particulates.

After both the inkjet ink and the post-treatment solution are applied to at least a portion of the medium 16, the medium 16 is a printed-on medium that may be exposed to a film-forming process in order to create the final printed medium. The film-forming process generally involves the application of heat and pressure to the printed-on medium.

Prior to the film-forming process, the printed-on medium 16 may be exposed to a drying process using an in-line or off-line dryer 28. Any suitable dryer 28 may be used and examples include those that are capable of applying heat, conduction, convection, radiation, microwaves, vacuum assisted drying, or other drying mechanisms. In an example, the dryer 28 is a forced air convective dryer. In another example, the dryer 28 includes the forced air convective dryer and one or more auxiliary infrared emitters. In yet another example, the dryer 28 includes a hybrid system of infrared heat and air convection. In this example, infrared emitters heat the air and the printed-on medium 16. The heated air dries the medium 16 and also provides a cushion pad to float the medium 16 through the dryer 28. A fan supplies the air and an automated damper regulates the air flow in the dryer zone to maintain the set temperature.

As shown in FIG. 1, the film-forming system 22 is in-line with the other components of the system 10. During operation of the system 10 when the film-forming system 22 is in-line, the printed-on medium 16 is moved (by the media transport system) to the film-forming system 22 after the post-treatment solution is applied thereon. It is to be understood that when the film-forming system 22 is off-line, the printed-on medium 16 may be transferred to the separate film-forming system 22, which may include its own media transport system (e.g., turning motor) to move the printed-on medium 16.

Whether in-line or off-line, the film-forming system 22 may include mechanisms and/or devices that expose the printed-on medium 16 (having ink and post-treatment solution applied thereon) to sufficient heat and pressure to assist the polymer particulates to coalesce and at least partially fuse together to form a continuous, transparent, glossy film on the medium 16. It is to be understood that the polymer particulates may also fuse together with any colorant particles present in the ink on the medium 16. Still further, when the medium 16 includes a coating layer, the polymer particulates may fuse to the colorant particles as well as to the coating layer.

In an example, the film-forming system 22 includes a roller assembly having at least two rollers, namely a heated glossing roller 24 and a pressure roller 26. The printed-on medium 16 is exposed to both heat and pressure as it is transported between the heated glossing roller 24 and the pressure roller 26. The side of the printed-on medium 16 that has the ink and post-treatment solution applied thereto is positioned adjacent to the heated glossing roller 24 during the film-forming process. Temperature and pressure control units may be respectively operatively connected to the heated glossing roller 24 and the pressure roller 26 to obtain a suitable glossing temperature and pressure.

The heated glossing roller 24 may any single-layer roller or multi-layer roller that is capable of being heated to a desirable film-forming temperature, and that is capable of heating the printed-on medium 16 adjacent thereto. The surface temperature of the glossing roller 24 may be controlled to anywhere from 10 degrees less than the minimum film-forming temperature of the polymer particulates used to 150 degrees over the minimum film-forming temperature of the polymer particulates used. As an example, if the minimum film-forming temperature of the polymer particulates is 50° C., then the surface temperature of the glossing roller 24 may range anywhere from 40° C. (i.e., 50° C.−10° C.) to 200° C. (i.e., 50° C.+150° C.). In some examples, the surface temperature of the glossing roller 24 may also be controlled to anywhere from 5 degrees less than the minimum film-forming temperature of the polymer particulates used to 100 degrees over the minimum film-forming temperature of the polymer particulates used. As an example, if the minimum film-forming temperature of the polymer particulates is 70° C., then the surface temperature of the glossing roller 24 may range anywhere from 65° C. (i.e., 70° C.–5° C.) to 170° C. (i.e., 70° C.+100° C.). In still other examples, the surface temperature of the glossing roller 24 may also be controlled to anywhere from the minimum film-forming temperature of the polymer particulates used to 50 degrees over the minimum film-forming temperature of the polymer particulates used. As an example, if the minimum film-forming temperature of the polymer particulates is 100° C., then the surface temperature of the glossing roller 24 may range anywhere from 100° C. (i.e., 100° C.–0° C.) to 150° C. (i.e., 100° C.+50° C.).

In an example, the heated glossing roller 24 includes a thermally conductive silicone core which regulates the heat flow to the printed-on medium 16. This thermally conductive silicone core may include an outer coating which enables heat transfer but also provides a releasing property so that the final printed medium does not adhere to the heated glossing roller 24. In an example, this outer coating may contain polytetrafluoroethylene (PTFE). An example of a heated glossing roller 24 including a silicone core and a PTFE coating is available from Minco Manufacturing Inc.

As shown in FIG. 1, within the film-forming system 22, the pressure roller 26 is positioned across from the heated glossing roller 24 and the printed-on medium 16 is directed between the rollers 24, 26. The pressure roller 26 may be adjusted to alter the gap between the rollers 24, 26 so that a suitable pressure is supplied to the printed-on medium 16. The pressure roller 26 may be made of a fluoroelastomer, such as copolymers of vinylidene fluoride, hexafluoropropylene, and tetrafluoroethylene.

The rollers 24, 26 may be operated so that the line speed of the printed-on medium 16 ranges from about 5 feet per minute up to about 1500 feet per minute. If film-forming is performed off-line or near-line from printing, then the rollers 24, 26 may be operated at higher line speeds.

Examples of other suitable film-forming systems 22 include laser fusing systems.

In another example that is not shown in the drawings, the post-treatment applicator 20 and the film-forming system 22 may be combined. This combined system may be in-line with or off-line from the other components of the system 10. In this example, the medium 16, having ink printed thereon, may be transported by the pressure roller 26 before the medium 16 is placed into contact with the heated glossing roller 24. In this example, the post-treatment applicator 20 is positioned adjacent to the pressure roller 26 to apply the post-treatment solution to the medium 16 to form the printed-on medium that will subsequently be directed between the rollers 24, 26 and in contact with the heated glossing roller 24 for film formation.

It is believed that the post-treatment solution disclosed herein, when exposed to the film-forming process, generates the continuous, transparent film which has about a 15% higher gloss level than a medium including an untreated printed image. The gloss level of the continuous, transparent film depends, at least in part, on the chemical structure of polymer particulates, the surface morphology and release capability of the rollers, the film-forming temperature, pressure, moisture, and speed, the properties of the medium 16 (such as caliper, surface smoothness, and coating chemistry), or combinations thereof.

As previously mentioned, the fused polymer particulates form a continuous, transparent film on the medium 16. This film also serves as a protective coating that protects the previously applied colorants so that the colorants are not easily removed by external forces, such as rubbing.

To further illustrate the present disclosure, examples are given herein. It is to be understood that these examples are provided for illustrative purposes and are not to be construed as limiting the scope of the present disclosure.

EXAMPLE 1

Images were printed on commercially available 70#T Utopia Dull Inkjet coated paper (Appleton Coated, Combined Locks, Wis.) using an HP Edgeline printer and HP A50 inks. Three sets of printed images were created using black ink, cyan ink, magenta ink, and yellow ink. Each of the sets also included a red printed image.

A post-treatment solution was made including: 100 parts of HP 787 MI latex (an acrylic-styrene based polymer particulates), 5 parts of 2-pyrrolidone (i.e., a film-forming agent), and 0.5 parts of BYK®-DYNWET® 800 (a nonionic surfactant). Liquid carrier (water) was added to make the final post-treatment solids at 10.24%.

Different samples were prepared using the three sets of printed images. The first sample (Sample 1) was a comparative sample that included no post-treatment solution applied to the first set of printed images. The second sample (Sample 2) included 0.5 gsm of the post-treatment solution applied to the second set of printed images. The third sample (Sample 3) included 1.0 gsm of the post-treatment solution applied to the third set of printed images. The post-treatment solution was applied using a Mayer rod. All of the samples were dried using an air heat gun.

Dried samples 2 and 3 (i.e., those sample including the post-treatment solution) were then passed through a laser fuser system for heat treatment.

To test the durability of the samples, both dry rub and wet (water) smudge testing were performed. The dry rub test was performed using the solid red color printed images of Samples 1, 2, and 3. The dry rub test was performed using a Taber tester having an eraser tip and a 250 g weight. The eraser tip was cleaned with sandpaper for 3 cycles before performing the dry rub test. The eraser tip was rubbed 1 time (back and forth) on the solid red color printed images of each of Samples 1, 2, and 3. The Samples were visually ranked from 1 to 3, with 3 being the best (i.e., least amount of scratch). As illustrated in Table 1, Samples 2 and 3, including the post-treatment solution, exhibited improved dry rub performance in comparison to Sample 1, which did not include the post-treatment solution.

The wet (water) smudge test was performed by pouring 50 µL of water on each of the solid cyan, magenta, yellow, and black color printed images. After 30 seconds, the print area was smudged back and forth 5 times with 0.25 lbs weight using a cotton cloth mounted on the top of a Sutherland rub tester. The different color printed images in each of the Samples were visually ranked from 1 to 3, with 3 being the best (i.e., least amount of smudging). The average visual ranging for all the colors of each Sample is shown in Table 1. For example, the wet smudge for the Sample 1 is the average for each of the cyan, magenta, yellow, and black color printed images having no post-treatment solution thereon. As illustrated in Table 1, Samples 2 and 3, including the post-treatment solution, exhibited improved wet rub performance in comparison to Sample 1, which did not include the post-treatment solution.

TABLE 1

| Relative Visual Ranking* | | |
|---|---|---|
| Sample ID | Dry Rub | Wet Smudge |
| 1 - Control | 1 | 1 |
| 2 - 0.5 gsm treatment | 2 | 2 |
| 3 - 1.0 gsm treatment | 3 | 2 |

*1 worst, 3 best

It is to be understood that the ranges provided herein include the stated range and any value or sub-range within the stated range. For example, a range from about 0.5 wt. % to about 15 wt. % should be interpreted to include not only the explicitly recited limits of about 0.5 wt. % to about 15 wt. %, but also to include individual values, such as 0.75 wt. %, 8 wt. %, 13.5 wt. %, etc., and sub-ranges, such as from about 1 wt. % to about 10 wt. %, from 3 wt. % to about 12 wt. %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A post-treatment solution for digital inkjet printing, the post-treatment solution comprising:
   polymer particulates having a minimum film-forming temperature that is at least 50° C.;
   a film-forming agent selected from the group consisting of citrate compounds, sebacate compounds, ethoxy alcohols, glycol oligomers, glycol polymers, glycol ether, glycerol acetals, and cyclic amides; and
   a liquid carrier.

2. The post-treatment solution as defined in claim 1 wherein the film-forming agent is a cyclic amide selected from the group consisting of β-lactam, γ-lactam, δ-lactam, and mixtures thereof.

3. The post-treatment solution as defined in claim 2 wherein one of:
   the γ-lactam is selected from the group consisting of N-methyl-2-Pyrrolidone, 5-methyl-2-Pyrrolidone, and 2-Pyrrolidone;
   the β-lactam is selected from the group consisting of clavam, oxacephem, cephem, penam, carbapenam, and monobactam; and
   the δ-lactam is selected from the group consisting of caprolactam and glucarolactam.

4. The post-treatment solution as defined in claim 1 wherein:
   the polymer particulates are present in an amount ranging from about 0.5 wt. % to about 50 wt. %;
   the film-forming agent and the polymer particulates are present in a weight ratio ranging from about 1:100 to about 1:1; and
   the liquid carrier is a balance of the solution so that a solids content of the post-treatment solution is up to 70%.

5. The post-treatment solution as defined in claim 1, further comprising a surfactant.

6. The post-treatment solution as defined in claim 1, further comprising a polymer binder.

7. The post-treatment solution as defined in claim 1 wherein the polymer particulates are homopolymers of methacrylic acid esters, or copolymers of an methacrylic acid ester and any of an acrylic acid ester, styrene and divinyl benzene.

8. A printing method, comprising:
   applying an inkjet ink on a medium;
   applying the post-treatment solution as defined in claim 1 on at least a portion of the medium after the inkjet ink is applied thereon, thereby forming a printed-on medium; and
   exposing the printed-on medium to a film-forming process to form a transparent film.

9. The printing method as defined in claim 8, further comprising controlling a temperature of the film-forming process by controlling a temperature of a glossing roller used in the exposing step to anywhere from 10 degrees less than the minimum film-forming temperature of the polymer particulates to 150 degrees more than the minimum film-forming temperature of the polymer particulates.

10. The printing method as defined in claim 8, further comprising exposing the printed-on medium to a drying process before performing the exposing step.

11. A print medium, comprising:
   a substrate;
   an inkjet ink applied to at least a portion of the substrate; and
   a post-treatment solution applied to the substrate to form a transparent film on the substrate, the post-treatment solution including:
      polymer particulates having a minimum film-forming temperature that is at least 50° C.;
      a film-forming agent selected from the group consisting of citrate compounds, sebacate compounds, ethoxy alcohols, glycol oligomers, glycol polymers, glycol ether, glycerol acetals, and cyclic amides; and
      a liquid carrier.

12. The print medium as defined in claim 11, further comprising the transparent film after the applied post-treatment solution has been exposed to a film-forming process.

13. The print medium as defined in claim 11 wherein from about 0.1 gsm to about 15.0 gsm of the post-treatment solution is applied to the substrate.

14. A printing system, comprising:
   a media transport device to move a medium;
   an inkjet ink applicator to apply an inkjet ink on the medium;
   a post-treatment applicator to apply a post-treatment solution on the medium after the inkjet ink is applied on the medium;
   the post-treatment solution contained in the post-treatment applicator, the post-treatment solution, including:
      polymer particulates having a minimum film-forming temperature that is at least 50° C.;
      a film-forming agent selected from the group consisting of citrate compounds, sebacate compounds, ethoxy alcohols, glycol oligomers, glycol polymers, glycol ether, glycerol acetals, and cyclic amides; and
      a liquid medium; and
   a film-forming system.

15. The printing system as defined in claim 14 wherein the film-forming agent is a cyclic amide selected from:
   a γ-lactam selected from the group consisting of N-methyl-2-Pyrrolidone, 5-methyl-2-Pyrrolidone, and 2-Pyrrolidone;
   a β-lactam selected from the group consisting of clavam, oxacephem, cephem, penam, carbapenam, and monobactam; and a δ-lactam selected from the group consisting of caprolactam and glucarolactam.

\* \* \* \* \*